(12) United States Patent
Hammes

(10) Patent No.: US 9,612,358 B2
(45) Date of Patent: Apr. 4, 2017

(54) SECURITY SYSTEM FOR SECURING THE SURROUNDINGS OF AN OBJECT

(71) Applicant: SICK AG, Waldkirch (DE)

(72) Inventor: Markus Hammes, Waldkirch (DE)

(73) Assignee: SICK AG, Waldkirch (DE)

(*) Notice: Subject to any disclaimer, the term of this patent is extended or adjusted under 35 U.S.C. 154(b) by 0 days.

(21) Appl. No.: 14/880,516

(22) Filed: Oct. 12, 2015

(65) Prior Publication Data

US 2016/0109616 A1    Apr. 21, 2016

(30) Foreign Application Priority Data

Oct. 20, 2014  (DE) .................... 10 2014 115 260

(51) Int. Cl.
| | | |
|---|---|---|
| *G01V 8/26* | (2006.01) | |
| *G01S 7/481* | (2006.01) | |
| *G01S 17/02* | (2006.01) | |
| *G01S 17/10* | (2006.01) | |
| *G01S 17/42* | (2006.01) | |
| *G01S 17/87* | (2006.01) | |
| *G01S 17/93* | (2006.01) | |
| *G01S 7/497* | (2006.01) | |

(52) U.S. Cl.
CPC ............ *G01V 8/26* (2013.01); *G01S 7/4817* (2013.01); *G01S 7/497* (2013.01); *G01S 17/026* (2013.01); *G01S 17/10* (2013.01); *G01S 17/42* (2013.01); *G01S 17/87* (2013.01); *G01S 17/936* (2013.01); *G01S 2007/4975* (2013.01)

(58) Field of Classification Search
CPC .......... G01S 17/10; G01S 17/42; G01S 17/87; G01S 17/936; G01S 17/026; G01S 7/4817; G01S 7/497; G01S 2007/4975; G01V 8/26

USPC ............ 356/4.01, 434; 250/214 R, 214 SW, 250/206.1, 216, 492.21; 340/825.57, 340/825.97, 815.45

See application file for complete search history.

(56) References Cited

U.S. PATENT DOCUMENTS

| | | | | |
|---|---|---|---|---|
| 5,903,355 A | * | 5/1999 | Schwarz ................. | G07C 9/00 250/221 |
| 7,089,114 B1 | * | 8/2006 | Huang ..................... | B60T 7/22 340/435 |

(Continued)

FOREIGN PATENT DOCUMENTS

DE    4340756 A1    6/1994

*Primary Examiner* — Sang Nguyen

(74) *Attorney, Agent, or Firm* — Nath, Goldberg & Meyer; Jerald L. Meyer; Leonid D. Thenor

(57) ABSTRACT

A safety laser scanner for securing the surroundings of at least one object has a first safety laser scanner with which a first defined reference target is associated and a second safety laser scanner with which a second defined reference target is associated. Each safety laser scanner includes: a light transmitter; a light deflection unit for a periodic deflection of the light into a scanning plane; a receiver for providing received signals in dependence on light remitted at articles present in the field of vision of the scanner; and an evaluation unit for evaluating the received signals with respect to the angle and the distance of the article and for providing a safety signal. Furthermore, the scanning planes of both scanners are aligned in a coplanar manner and the first scanner forms the second reference target and the second scanner forms the first reference target.

18 Claims, 4 Drawing Sheets

(56) References Cited

U.S. PATENT DOCUMENTS

Figure 1:
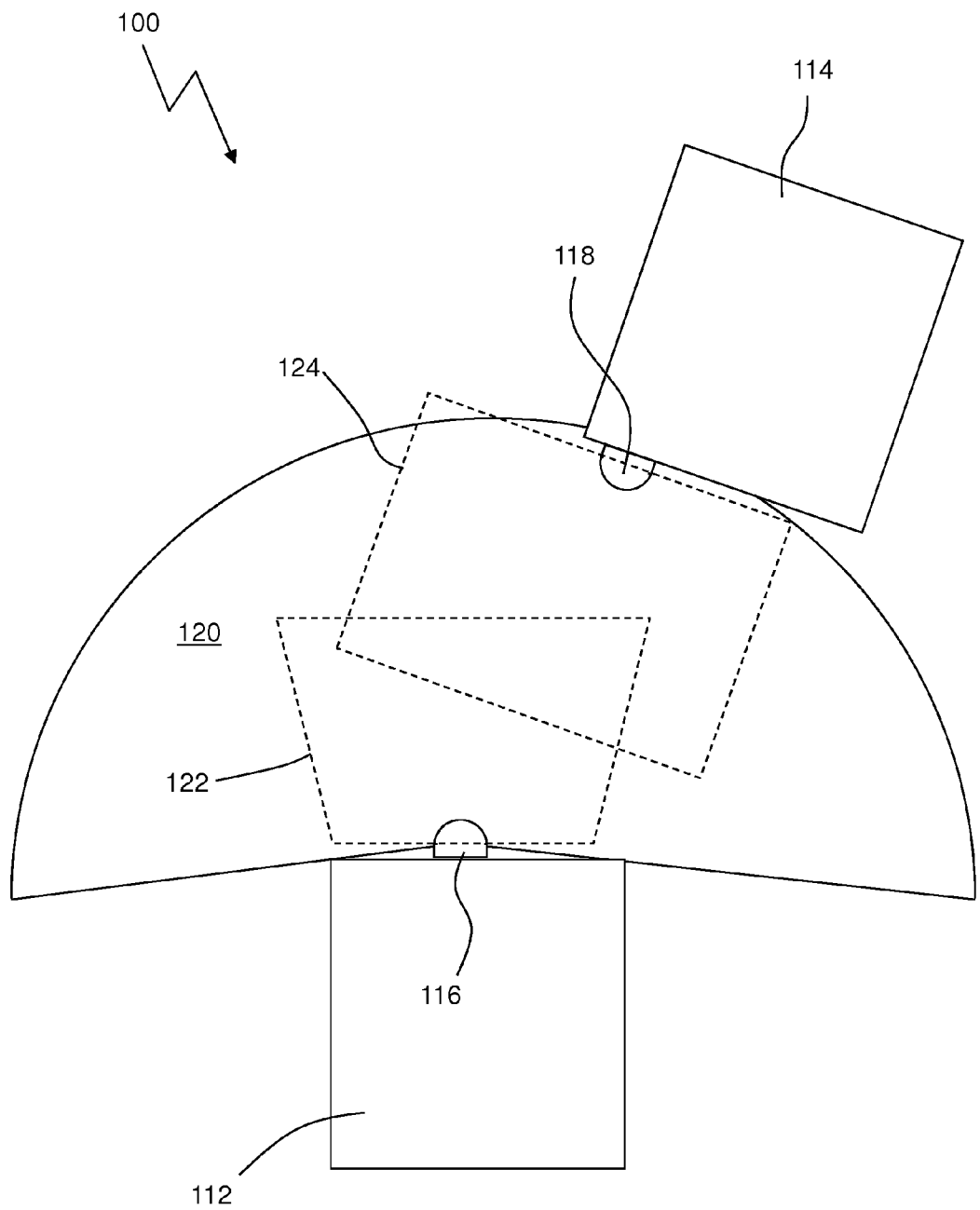

| | | | | |
|---|---|---|---|---|
| 2009/0287453 A1* | 11/2009 | Oh | ............... | G01B 11/03 |
| | | | | 702/159 |
| 2010/0198365 A1* | 8/2010 | Kawabata | ............ | G01S 7/4812 |
| | | | | 700/12 |
| 2011/0095170 A1* | 4/2011 | Erb | ............... | F16P 3/14 |
| | | | | 250/214 R |
| 2013/0250302 A1* | 9/2013 | Kramer | ............ | G01S 17/42 |
| | | | | 356/434 |
| 2013/0301030 A1* | 11/2013 | Hulm | ............... | G01S 7/4817 |
| | | | | 356/4.01 |
| 2015/0323654 A1* | 11/2015 | Jachmann | ............ | G01S 7/4865 |
| | | | | 356/5.01 |

\* cited by examiner

SECURITY SYSTEM FOR SECURING THE SURROUNDINGS OF AN OBJECT

The invention relates to a security system for securing the surroundings of at least one object and to a method for securing the surroundings.

Safety laser scanners such as are known from DE 43 40 756 A1 are frequently used for the monitoring of work spaces. A light beam generated by a laser is deflected via a light deflection unit into a scanning plane and is remitted there by an article which may be present. The remitted light moves back to the laser scanner again and is detected by a receiver there. The light deflection unit is designed to be pivotable or rotatable as a rule such that the light beam generated by the laser periodically sweeps over a scanning plane generated by the pivot movement or rotary movement. If a light signal remitted by the article is received from the scanning plane, a conclusion can be drawn on the angular location of the article in the protected zone from the angular position of the deflection unit. If the transit time of individual laser light pulses is, for example, additionally monitored from the transmission up to the reception of a reflection at the article, it is additionally possible to draw a conclusion on the distance of the article from the laser scanner from the transit time using the speed of light. The location of an article can be determined and two-dimensional protected fields within the scanning plane can, for example, be completely monitored using the angle and distance data. If an unauthorized article is located in the protected field, a corresponding warning signal or stop signal can be output by the evaluation unit of the scanner.

Such systems are used, for example, at machines with which a danger zone has to be monitored which may not be entered by an operator during the operation of the machine. If an unauthorized article—that is, for example, a leg of an operator—is detected in the danger zone with the help of the laser scanner, an emergency stop of the machine is effected. Such scanning systems as safety sensors have to work reliably and must therefore satisfy high safety demands, for example the EN13849 standard for machine safety and the device standard EN61496 for protective devices working in a contactless manner (ESPE=electrosensitive protective equipment).

A number of measures have to be taken to satisfy these safety standards such as reliable electronic evaluation by redundant, diverse electronics, function monitoring by, for example, monitoring the contamination of optical components, in particular of a front screen, and/provision of individual reference targets with defined degrees of reflection which have to be recognized at the corresponding scanning angles.

Laser scanners are nevertheless dependent on an external reference target in various applications despite these measures. For, e.g. unlike with light grids there is namely no "expectation", that is no defined signal that signals the safe state during the detection using a laser scanner. It is assumed with laser scanners that in the absence of an optical echo no article is present in the sensing beam and this conclusion is in particular problematic at times in technical safety applications. An optical echo can thus, for example, also be suppressed by contamination of the front screen, by mist or by dark dust or also by the surface properties and geometry of the sensed article.

An external reference target with which the scanner can check its detection capability and can optionally switch off for safety reasons is inter alia made use of in applications in which such complications have to be taken into account. Alternatively, such reference targets can also be used to provide defined optical conditions in an otherwise completely variable scene in order thus to create the basis for a reliable detection. An example is the named collision protection function of the safety laser scanner. In addition to persons, forklift trucks, so-called DTS ("driverless transport systems") should also be reliably detected. Since it is not possible to start from the optical properties of persons and textiles in this case (remission greater than 2%, diffuse scattering of the surface), but one is rather faced with very variable surroundings, additional reference targets have to be attached to the vehicles involved. It must therefore be ensured, in addition to the above-described operational reliability of the scanner itself, that the other vehicle is also actually recognized in the surroundings. The external reference targets at each vehicle ensure this.

This measure is effective, but is, first, sometimes complex and/or expensive and is, second, not uncritical from a technical safety aspect. There are a number of problems or special features with external reference targets which have to be observed and taken into account in the safety concept, namely:

they have to be additionally attached;
they interfere with the design freedom of the vehicle manufacturers;
they always have to be visible, i.e. they may also not be hidden by a load to be transported;
they become dirty and are thereby less visible, which can reduce the reliability in an unpermitted manner; and
they are usually only stuck on and can therefore drop off over time when the adhesive application deteriorates.

A safety concept has to take all of these things into account and measures have to be taken or fixed so that these difficulties cannot result in safety problems. This is correspondingly complex and expensive.

The same or similar observations also apply to stationary applications when e.g. a crossing region in the outdoor area, e.g. in a container terminal, has to be secured using such systems.

Starting from this prior art, it is the object of the invention to provide a security system with which the named disadvantages can be avoided.

This object is satisfied by a security system having the features of claim 1 and by a method having the features of claim 8.

The security system in accordance with the invention for securing the surroundings of at least one object has a first safety laser scanner with which a first defined reference target is associated and a second safety laser scanner with which a second defined reference target is associated. Each safety laser scanner comprises:

a light transmitter;
a light deflection unit for a periodic deflection of the light into a scanning plane;
a receiver for providing received signals in dependence on light remitted at articles present in the field of vision of the scanner;
and an evaluation unit for evaluating the received signals with respect to the angle and the distance of the article and for providing a safety signal.

In accordance with the invention, the scanning planes of both scanners are aligned in a coplanar manner and the first scanner forms the second reference target and the second scanner forms the first reference target.

The previously typical reference targets are therefore replaced by the scanner itself so that they are simply dispensed with in the new security system. Some of the aforesaid problems are thus automatically solved; for example, the impairment of visibility by the load, dirt or the like. A scanner will always be able to be seen from the other scanner of the same construction; for if visibility were hidden, the hidden scanner itself would output a safety signal since it is after all not operationally reliable.

An additional attachment of reference targets is dispensed with and the design freedom of the vehicle manufactures is maintained. They do not have to provide anything further than the scanner and do not have to take anything further into account in a technical safety aspect.

It has namely surprisingly been found that a scanner represents a good reference target for another scanner of the same construction since a scanner always has a high degree of reflection at some point, that is e.g. at the outer housing or at some component disposed in the interior which is visible to the scanner through a front screen due to the same wavelength of the light.

Since the one scanner always receives sufficient light for a detection through the other scanner acting as a reference target, the detection can be ensured independently of the properties of the objects (shape, varnish, gloss, etc.) and an operability of the security system can thus be realized as a collision protection e.g. on a use in driverless transport systems (DTS).

The system in accordance with the invention therefore works with scanners which so-to-say "see" each other and the light beam of the one scanner therefore shines into the other scanner. The light transmitter of one scanner therefore advantageously transmits pulsed light and the distance from the article is calculated via the pulse time of flight. As has been found, a mutual masking then therefore almost never occurs with scanners working according to the principle. It surprising takes place extremely rarely in reality that the light pulse of one scanner is incident on the other scanner at exact that point in time when the deflection unit with the other scanner is just positioned such that the pulse enters into the receiving optics. Even if this should occur at one time, it should still not be a problem since a scanner does not yet switch off on a single masking, but the scanner mostly checks whether the same masking occurs in the following scan.

In a further development of the invention, the scanner can recognize with reference to the received reflected light whether the reflected light is a characteristic reflection at another scanner or not.

This is advantageous in a plurality of respects.

In an application of the system in accordance with the invention as a collision protection at DTS, a vehicle can recognize with reference to the reflection whether another vehicle is in the field of view and can react accordingly. Such a recognition is independent of the scene, which can be of any complexity in a works hall with reflective shelves, walls, etc. and has a high variance from application site to application site. This recognition of another vehicle in any scene is extremely advantageous since the vehicles can be used with the new safety system immediately in any scene. This would not be possible with known reflectors as reference targets since the reflections from the reflector cannot necessarily be distinguished from other high reflections, e.g. at a metal shelf. The reflections at a scanner, however, have a characteristic extent so that they can be unambiguously recognized. The scanner can thus see a greatly modulated signal over the course of time which emanates from the rotating mirror of the oppositely disposed sensed scanner, as will be explained in more detail further below.

This can, however, also be very advantageous in a static application in the outdoor area. There is always the problem in the outdoor area of the unknown impaired visual range typically due to mist. This can result in serious safety problems if the scanner no longer sees any optical echoes despite articles in the protected zone. Such problems can also not be completely avoided by external reflectors as reference targets. If, however, in accordance with the invention, the scanner can now recognize a characteristic reflection (of the other scanner) on the basis of its reflection profile because namely e.g. the above-mentioned modulation of the signal is independent of the mist, it can unambiguously determine the visual range via the received intensity and the distance from the other scanner. The intensity is additionally admittedly reduced by visibility impairment, but relative intensities within the characteristic reflection profile are not affected by this. The scanner can thus unambiguously "know" where the reflection emanates from and can reliably conclude the visual range from the intensity and from the known distance.

In a further development of the invention, a typical reflection of the second scanner of light of the first scanner is taught in a teaching process. In this case, the contrast of the temporal oscillation of the received signal is typically evaluated. When the first scanner knows the typical characteristic reflection of a scanner, the first scanner can e.g. evaluate whether the other scanner is correctly recognized or whether e.g. visibility is impaired. Impaired visibility due to dust, mist or the like can thus be recognized and corresponding safety measures such as reduced speeds can be activated. Overall, the system remains better operational and thus has a higher availability.

If the safety laser scanners have an internal reflector mark, the characteristic reflection of the scanner can be improved and can be increased in its intensity. The internal reflector mark can therefore not only serve to check the scanner itself in a known manner, but rather also makes possible a better visibility and recognizability for the other scanner.

The system in accordance with the invention can advantageously be used at a vehicle, in particular at a driverless transport system, at which the first scanner is arranged and at a second vehicle at which the second scanner is arranged. The initially named disadvantages such as the attaching of reference targets; restricted design freedom; restricted visibility due to load or masking; dissolving adhesive application, can all be avoided.

The method in accordance with the invention for securing the surroundings of an object by a first and a second safety laser scanner comprises the steps:

arranging each scanner at a respective one object at the same respective height and in a reciprocal visual range;
aligning the scanner such that the scanning planes are coplanar,
wherein each scanner carries out the steps:
transmitting and deflecting a light beam into the scanning plane;
receiving light remitted at articles present in the field of vision of the scanner and providing received signals;
evaluating the received signals for determining the position of an article in the scanning plane and providing a safety signal in dependence thereon; and
recognizing from the received signals which of the detected reflections emanate from reflections of its own light in the respective other scanner.

Figure 2:
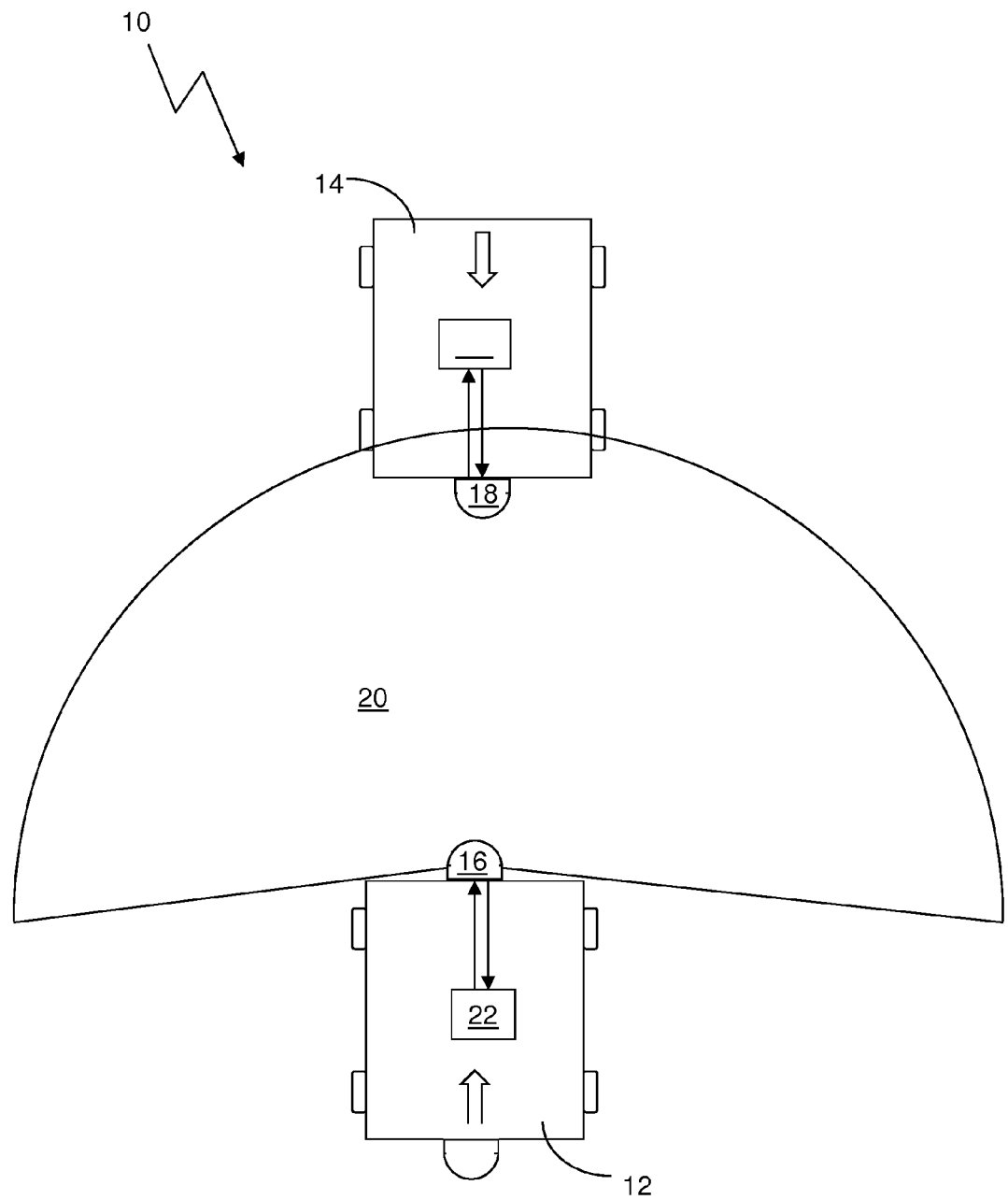
Figure 3:
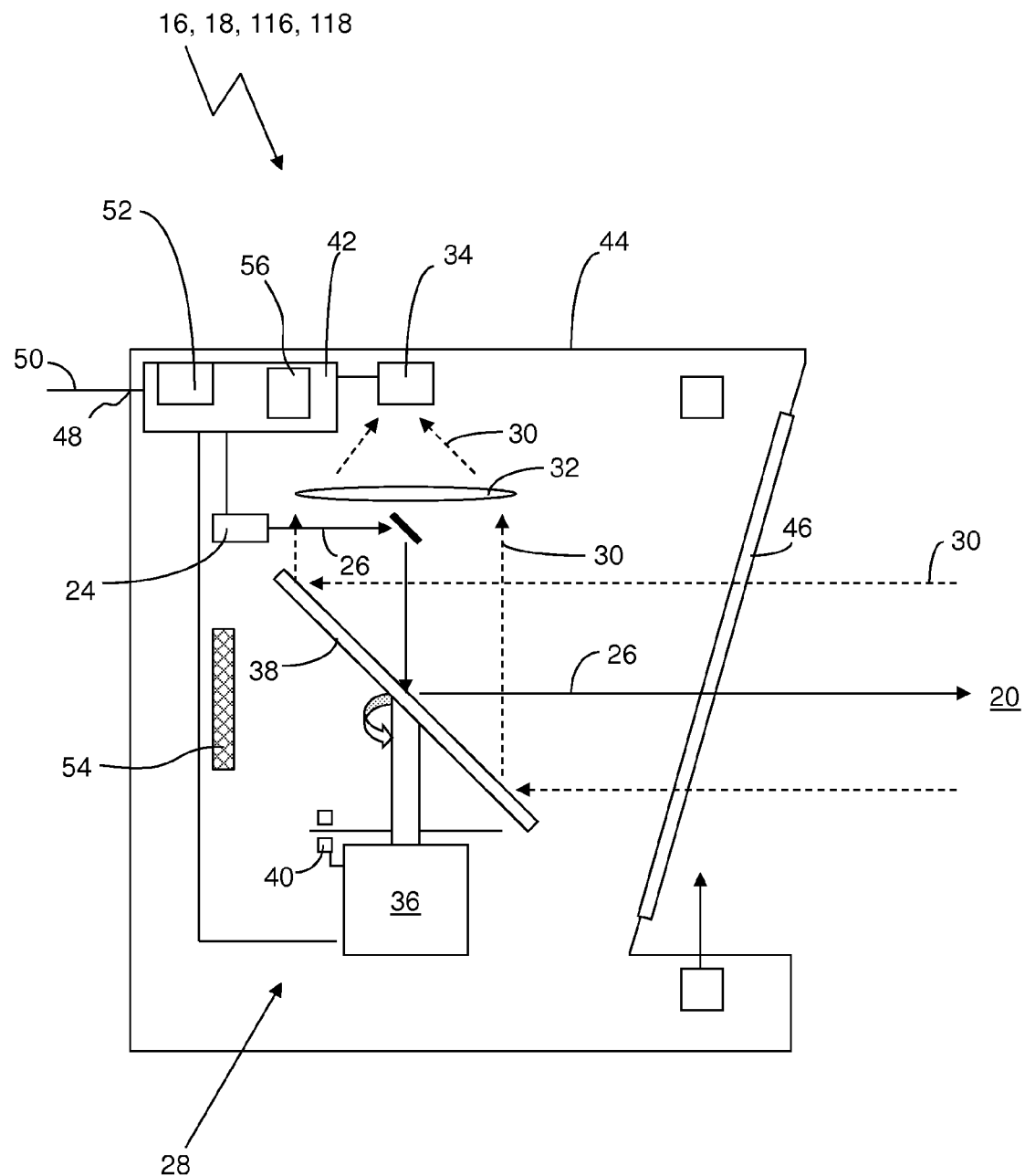
Figure 4:
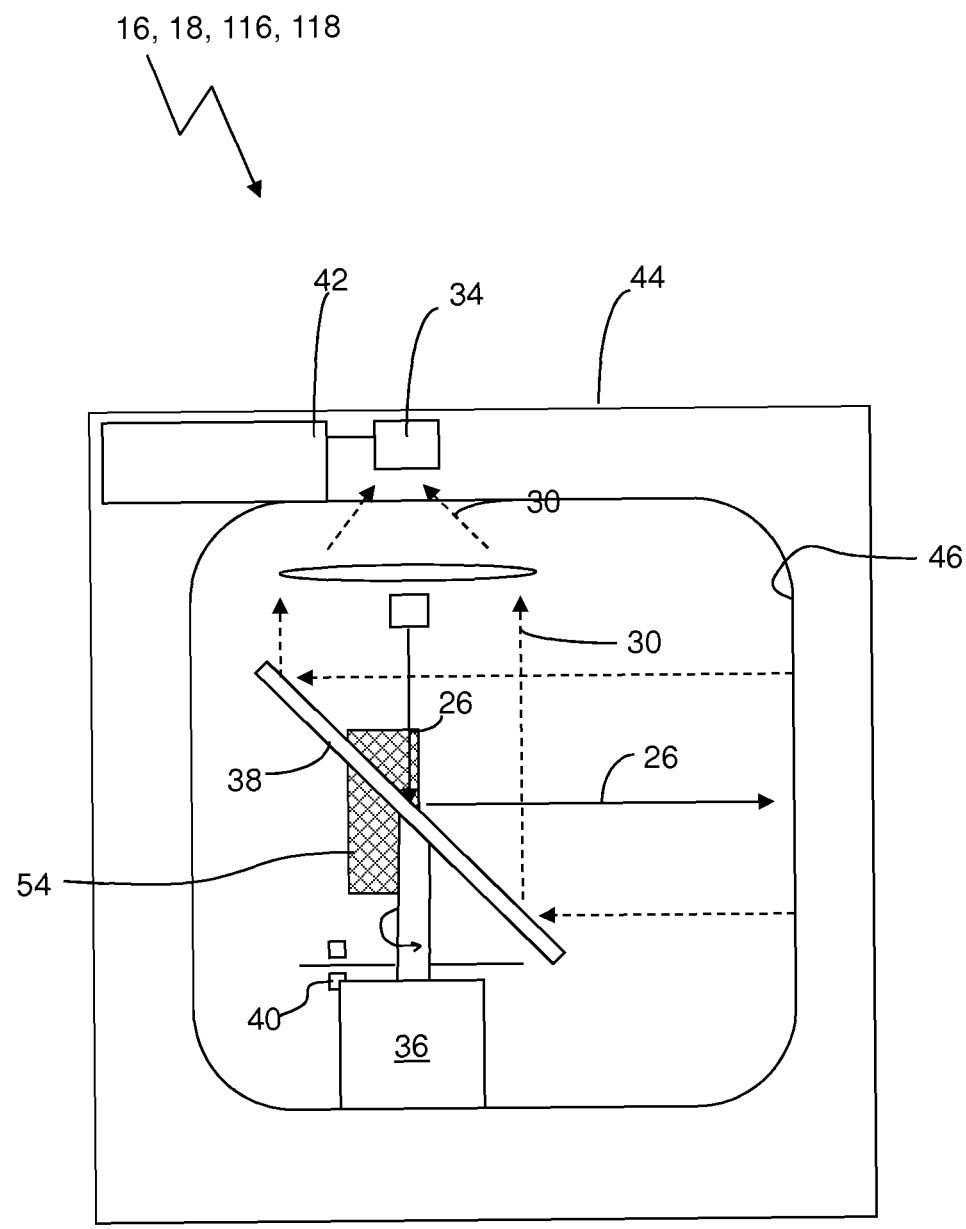

The invention will be explained in detail in the following with reference to embodiments and to the drawing. There are shown in the drawing:

FIG. 1 a schematic representation of the basic principle of the invention in a first embodiment (static application);

FIG. 2 a representation as FIG. 1 in a second embodiment (use at DTS);

FIG. 3 a schematic representation of a first safety light scanner for the invention in a side view; and FIG. 4 a schematic representation of a second scanner in a front view with a specific angular position of the deflection unit.

The basic principle of a first embodiment of the security system 100 in accordance with the invention for securing the surroundings of an object 102 is shown in FIG. 1. The "object 102" can be a machine 112 and/or 114. The surroundings should be secured against unauthorized entry, i.e. protected fields 122 and 123 are, for example, defined which may not be infringed in operation. The protected fields can secure danger zones around a machine; the danger zones can, however, also be crossing areas, e.g. in a container terminal, or the like, for example.

The system in accordance with the invention comprises at least two safety laser scanners 116 and 118 (also briefly called "scanners" in the following) which are each fastened to a machine 112 or 114 or the like.

The scanners 116 and 118 serve for the securing of the surroundings. The scanner 116 (and analogously the scanner 118) monitors a scanning plane 120 which is disposed in front of the scanner and which represents a field of view. The scanning plane 120 comprises a bounded protected field 122 into which no article or person may enter to avoid dangers. An intrusion must at least be reliably recognized. If an unauthorized article is located in the protected field 122 or 124, this is detected by the respective scanner and a warning signal is output and/or the movement causing the danger is stopped, e.g. an emergency stop.

So that the scanner 116 can secure its own function (visual range), a reference target is located in its field of vision. This reference target is formed by the other scanner 118. For this purpose, the two scanners 116 and 118 must each be arranged at the same level and must be aligned such that their scanning planes 120 are coplanar. The same naturally applies to the other scanner 118 whose scanning plane is not shown for reasons of clarity. The scanning light beam of the first scanner 116 then sweeps over the second scanner 118 and vice versa. The light beam is reflected in the scanner 118 at the components impacted by the light beam, as explained further below. On sweeping over the scanner 118, not only a high reflection is produced at at least one of the components of the scanner 118, but rather additionally a characteristic reflection profile. The scanner 116 can recognize this and then "knows" that the reflection actually emanates from the scanner 118. The scanner 118 is therefore seen and the visual range is sufficient.

FIG. 2 shows another example of the security system in accordance with the invention. Here, the surroundings of a vehicle 12 or 14, in particular of a driverless transport system (DTS) should be secured. The system 10 comprises at least two safety laser scanners 16 and 18 which are each fastened to a vehicle 12 or 14.

The scanners 16 and 18 serve for the securing of the surroundings of the respective vehicle 12 or 14. The scanner 16 or 18 monitors a scanning plane 20 which is disposed in front of the DTS and which comprises a bounded protected field, which is not shown, into which the other vehicle or also a person may not intrude during the travel to avoid collisions. If an unauthorized article is located in the protected zone, this is thus detected by the scanner and a warning signal is output and/or the movement causing the danger is stopped, e.g. an emergency braking and/or escape maneuver is initiated via the vehicle control.

In the same manner as in the previous example, the two scanners 16 and 18 are each arranged at the same height above the ground at the respective DTS 12 and 14 and are aligned such that their scanning planes 20 are coplanar. If the scanner 16 recognizes the other scanner 18, it can provide information (safety signals) to the vehicle control 22 in good time and can initiate the corresponding safety measures such as an emergency stop, braking or evading.

Each scanner 16 and 18 can here also advantageously recognize from its received signals which of the detected reflections emanate from reflections of its own light in the respective other scanner so that the reflections can be classified and an identification can take place whether another vehicle is actually approaching or whether it is another reflection, for example from a metal shelf or the like.

FIG. 3 schematically shows the basic design of such safety laser scanners 116, 118, 16, 18. A light beam 26 which is generated by a laser 24, and which is composed of individual light pulses is directed via a light deflection unit 28 into the scanning plane 20 and is there remitted by an article which may be present. The remitted light 30 arrives back at the laser scanner 16 again and is there detected by a receiver 34 via the deflection unit 28 and by means of a receiving optics 32. The light deflection unit 28 is rotatable as a rule, with a motor 36 continuously rotating a rotating mirror 38. The respective angular position of the rotating mirror 38 is detected via an encoder 40. The light beam 26 generated by the laser 24 thus sweeps over the scanning plane 20 generated by the rotary movement. If a reflected light signal 30 received by the receiver 34 is received from the scanning plane 20, a conclusion can be drawn on the angular location of the article in the scanning plane 20 from the angular position of the deflection unit 28. In addition, the time of flight of the individual laser light pulses of the transmitted light 26 is monitored from the transmission up to the reception of a reflection at the article and a conclusion is drawn on the distance of the article from the laser scanner 16 from the time of flight while using the speed of light. This evaluation takes place in an evaluation unit 42 which is connected for this purpose to the laser 24, to the receiver 34, to the motor 36 and to the encoder 40.

All the named functional components are arranged in a housing 44 which has a front screen 46 at the front side, that is in the region of the light exit and light entry, with the front screen naturally being permeable for the wavelength of the radiation used. An internal reflector mark 54 is arranged in the rear region of the housing 44 and is periodically swept over by the laser beam 26 on the rotation of the mirror 38. It serves to regularly check the operability of the laser, receiver and evaluation unit in that a periodic check is made whether the reflector mark 54 is also recognized and is recognized at the correct distance. The reflector mark 54 can have differently reflective regions in order also to be able to check the dynamics of the receiver 34.

All the data are processed in the evaluation unit 42 in order ultimately to be able to provide a safety signal on a line 50 at an output 48.

The evaluation unit 42 calculates the location of an article in the scanning plane 20 via the angle and distance data so that two-dimensional protected fields in the scanning plane 20 of the scanner 16 can be completely monitored in this manner as to whether an unauthorized article is located in the protected zone or whether the protected field is free. An emergency stop, an emergency braking and/or an escape maneuver can thus ultimately be effected in dependence on the safety signal at the output 48 of the laser scanner 16.

The evaluation unit 42 furthermore has a recognition unit 52 which can evaluate the received signals of the receiver 42 which depend on the reflections in the scanning plane 20 as to whether the detected reflections emanate from a scanner located in the scanning plane 20 (this would be the scanner 18 in FIG. 2). This is possible because the transmitted light 26 of the first scanner 16 enters through the front screen of the second scanner 18 of the same construction into the interior of the housing 44 of the second scanner 18 and illuminates the interior when scanning at the level of the scanning plane 20. The components arranged there reflect the light beam such that the scanner 16 receives a characteristic reflection profile. The components of the scanner 18 which are impacted by the light beam of the scanner 16 are typically circuit boards, housing parts, optical and electronic components, the mirror 38 and the reflector mark 54. Depending on the rotational position of the mirror 38, however, specific components become visible and others masked, e.g. the reflector mark 54 which is arranged in the rear housing part, which is behind the mirror 38 from the point of view of the front screen and which is only visible when the mirror 38 shows its side. This is shown for illustration in FIG. 4 which shows a schematic view of the scanner through the front screen, as the light beam 26 would "see". The angular position of the mirror 38 is such that the reflector mark 54 is visible here.

In sum, there are therefore different characteristic reflection profiles for the scanner 18 depending on the angular position of its rotational mirror 38.

These typical reflection profiles of the second scanner 18 should be taught in a teaching process which can already take place on the manufacture of the scanners, and should be stored in a memory 56. The first scanner 16 can then recognize the typical characteristic reflection of another scanner in its scanning plane 20.

The invention claimed is:

1. A security system for securing the surroundings of at least one object having a first safety laser scanner with which a first defined reference target is associated and having a second safety laser scanner with which a second defined reference target is associated, wherein a safety laser scanner has:
   a light transmitter;
   a light deflection unit for a periodic deflection of the light into a scanning plane;
   a receiver for providing received signals in dependence on light remitted at articles present in the field of vision of the scanner;
   and an evaluation unit for evaluating the received signals with respect to the angle and a distance of the article and for providing a safety signal,
characterized in that
the scanning planes of both scanners are coplanar and the first scanner forms the second reference target and the second scanner forms the first reference target,
wherein the evaluation unit comprises a scanner recognition unit with which each scanner can recognize from its received signals which of the detected reflections emanate from reflections of its own light in the respective other scanner.

2. A system in accordance with claim 1, wherein the light transmitter transmits pulsed light and the distance from the article is calculated via the pulse time of flight.

3. A system in accordance with claim 1, wherein a typical reflection of the second scanner of light of the first scanner, and vice versa, is taught in a teaching process.

4. A system in accordance with claim 3, wherein the evaluation unit has an impaired visibility detection unit.

5. A system in accordance with claim 4, wherein the object is a vehicle, in particular a driverless transport system, at which the first scanner is arranged; and in that the second scanner is arranged at a second vehicle.

6. A system in accordance with claim 1, wherein the object is a vehicle, in particular a driverless transport system, at which the first scanner is arranged; and in that the second scanner is arranged at a second vehicle.

7. A security system for securing the surroundings of at least one object having a first safety laser scanner with which a first defined reference target is associated and having a second safety laser scanner with which a second defined reference target is associated, wherein a safety laser scanner has:
   a light transmitter;
   a light deflection unit for a periodic deflection of the light into a scanning plane;
   a receiver for providing received signals in dependence on light remitted at articles present in the field of vision of the scanner;
   and an evaluation unit for evaluating the received signals with respect to the angle and a distance of the article and for providing a safety signal,
characterized in that
the scanning planes of both scanners are coplanar and the first scanner forms the second reference target and the second scanner forms the first reference target, wherein each scanner has an internal reflector mark.

8. A system in accordance with claim 7, wherein the light transmitter transmits pulsed light and the distance from the article is calculated via the pulse time of flight.

9. A system in accordance with claim 7, wherein a typical reflection of the second scanner of light of the first scanner, and vice versa, is taught in a teaching process.

10. A system in accordance with claim 9, wherein the evaluation unit has an impaired visibility detection unit.

11. A system in accordance with claim 10, wherein the object is a vehicle, in particular a driverless transport system, at which the first scanner is arranged; and in that the second scanner is arranged at a second vehicle.

12. A system in accordance with claim 7, wherein the object is a vehicle, in particular a driverless transport system, at which the first scanner is arranged; and in that the second scanner is arranged at a second vehicle.

13. A system in accordance with claim 7, wherein the object is a vehicle, in particular a driverless transport system, at which the first scanner is arranged; and in that the second scanner is arranged at a second vehicle.

14. A security system for securing the surroundings of at least one object having a first safety laser scanner with which a first defined reference target is associated and having a second safety laser scanner with which a second defined reference target is associated, wherein a safety laser scanner has:
   a light transmitter;
   a light deflection unit for a periodic deflection of the light into a scanning plane;
   a receiver for providing received signals in dependence on light remitted at articles present in the field of vision of the scanner;

and an evaluation unit for evaluating the received signals with respect to the angle and a distance of the article and for providing a safety signal,
characterized in that
the scanning planes of both scanners are coplanar and the first scanner forms the second reference target and the second scanner forms the first reference target,
wherein a typical reflection of the second scanner of light of the first scanner, and vice versa, is taught in a teaching process,
wherein the evaluation unit has an impaired visibility detection unit,
wherein each scanner has an internal reflector mark.

15. A system in accordance with claim 14, wherein the light transmitter transmits pulsed light and the distance from the article is calculated via the pulse time of flight.

16. A system in accordance with claim 14, wherein a typical reflection of the second scanner of light of the first scanner, and vice versa, is taught in a teaching process.

17. A system in accordance with claim 16, wherein the evaluation unit has an impaired visibility detection unit.

18. A system in accordance with claim 17, wherein the object is a vehicle, in particular a driverless transport system, at which the first scanner is arranged; and in that the second scanner is arranged at a second vehicle.

* * * * *